United States Patent [19]
Pollock

[11] 3,948,481
[45] Apr. 6, 1976

[54] DRAINCOCK FOR AUTOMOTIVE COOLING SYSTEM

[75] Inventor: Barry R. Pollock, University Heights, Ohio

[73] Assignee: The Weatherhead Company, Cleveland, Ohio

[22] Filed: May 2, 1974

[21] Appl. No.: 466,164

[52] U.S. Cl. ............... 251/351; 251/144; 137/351; 184/1.5; 29/157.1 R
[51] Int. Cl.² ............................................ F16K 5/02
[58] Field of Search ........... 251/334, 144, 351, 349, 251/353, 354; 137/351; 184/1.5; 29/157.1

[56] References Cited
UNITED STATES PATENTS

| | | | |
|---|---|---|---|
| 43,218 | 6/1864 | McGhan | 251/351 |
| 1,678,927 | 7/1928 | Weatherhead, Jr. | 251/351 |
| 1,684,932 | 9/1928 | Weatherhead, Jr. | 251/351 X |
| 2,330,881 | 10/1943 | Gora | 251/334 |
| 2,577,654 | 12/1951 | Gates | 29/157.1 R |
| 3,719,345 | 3/1973 | Bridegum | 251/351 |
| 3,789,881 | 2/1974 | Kozulla et al. | 251/334 X |

*Primary Examiner*—William R. Cline
*Attorney, Agent, or Firm*—McNenny, Farrington, Pearne & Gordon

[57] ABSTRACT

A screw-type draincock assembly in which separate body and stem parts are each integral elements and in which the body part provides an external seat and the stem part provides a transverse handle. The valve assembly is preferably formed by initially arranging a head portion of the valve stem to pass through the threaded bore and external seat of the body and, subsequent to assembly of the stem in the body, plastically flaring the head portion to a configuration adapted to seal the external body seat.

1 Claim, 3 Drawing Figures

DRAINCOCK FOR AUTOMOTIVE COOLING SYSTEM

BACKGROUND OF THE INVENTION

The invention relates to valves and a method of their manufacture and, more specifically, to improvements in screw-type draincocks.

PRIOR ART

The invention provides a draincock or valve particularly suited for automotive cooling systems and other high production, low cost applications. A general type of valve to which the invention relates is disclosed in U.S. Pat. No. 1,345,032 to Smith. This patent discloses a valve body and stem assembly which is provided with an external seat, i.e., a seat on the exterior of the valve body. The assembly is characterized by a two-piece stem structure in which a separate handle is joined to the stem by a spinning or other metal deforming step. Such a process is disclosed in U.S. Pat. No. 1,684,932 to A. J. Weatherhead, Jr. Among the long-standing disadvantages of this prior type of valve is the requirement of the separate manufacture and handling of both stem and handle parts and the necessary step of their assembly. Furthermore, the joint between the stem and handle has often been the weakest area of the assembly. The connection between the stem and handle has been subject to failure upon inadvertent overstressing of the valve by a person attempting to remove the valve stem under the mistaken impression that it was removable or where a high torque was required to initially open the valve after a long period of non-use.

Another type of draincock, with an internal valve seat, such as disclosed in U.S. Pat. No. 1,678,927 to A. J. Weatherhead, Jr., is adapted to be made with an integral stem and handle. The internal valve seat construction, though, is more readily fouled by sediment or free foreign material in the fluid vessel to which the valve is applied than is the external seat construction. While the external seat construction referred to above allows the stem head to break or clear away sediment coatings from the seat area when it is opened, the internal seat construction does not provide such a feature. A refrigeration service valve having an internal seat and having certain features similar to the valve of the present invention is disclosed in U.S. Pat. No. 3,789,881 to Kozulla et al.

SUMMARY OF THE INVENTION

The invention provides a draincock having an external seat and an internal stem and handle, thereby affording the advantages of both of these features in a single valve assembly. In addition to being self-clearing when initially opened and resistant to failure at the stem and handle juncture, the valve assembly of the invention is economical to produce, comprises a minimum number of parts, and cannot be inadvertently or accidentally disassembled.

In the preferred embodiment, the valve body, formed of brass or other noncorrosive material, includes a stem receiving bore. One end of this body bore is internally threaded to provide a screw lead for the stem, while the other end is counterbored and includes an annular seat at the junction of the counterbore and adjacent end face of the body. The valve stem, again preferably of brass or other noncorrosive material, is advantageously formed with an integral T-handle and is externally threaded along a midportion of its length adjacent the handle. Opposite the handle end, the stem includes an integral head portion initially dimensioned to pass through the internal threads of the body to permit screw assembly of the stem into the body. After the stem is received into the body, the integral head portion is plastically flared or deformed radially outwardly to a final expanded configuration for sealing against the annular seat of the body. Ideally, the stem head portion includes a pilot bore adapted to receive and guide a flaring tool and to provide a tubular cross section which may be expanded with a relatively low force and which provides structural resilience in the sealing area for more positive sealing action.

DESCRIPTION OF THE PREFERRED EMBODIMENT

Figure 1:
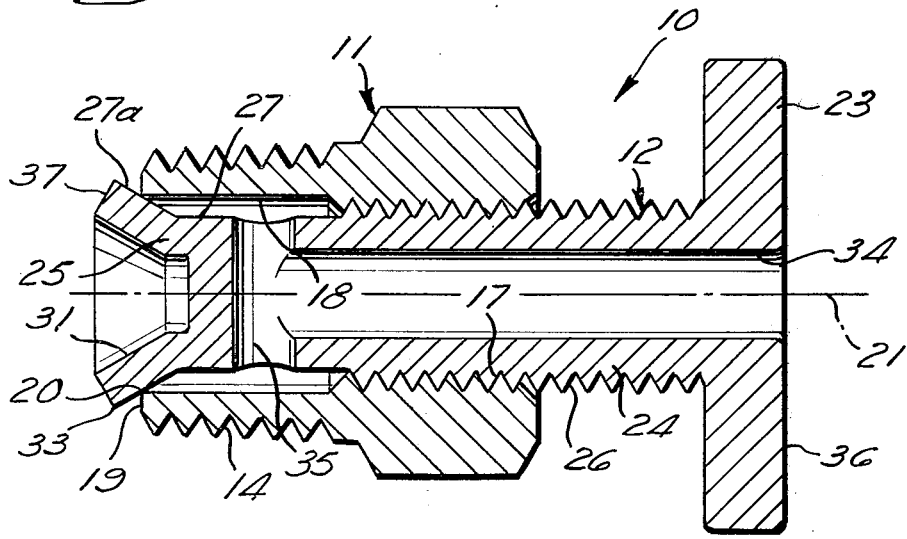
FIG. 1 is a longitudinal cross sectional view of a fitting assembly, shown in a closed position, constructed in accordance with the invention.

Referring to the figures, there is shown a valve assembly 10 which comprises a body 11 and stem 12. The body 11 is conveniently formed from extruded hexagonal bar stock of brass or other corrosion-resistant material. At a rearward end of the body 11, the original stock surfaces are left to provide wrenching flats 13, while at the forward end of the body, these surfaces are machined or otherwise displaced to provide external pipe threads 14 for mounting the body 11 on a fluid-containing vessel. The body 11 is provided with a through bore comprising an area of internal threads 17 at the rearward end of the body and a counterbore 18 at the forward body end. A radial end face 19 of the body 11 intercepts counterbore 18 to form an annular seat or edge 20.

The stem 12 comprises integral handle, threaded, and head portions 23, 24, and 25, respectively. Like the body 11, the stem 12 is advantageously formed of corrosion-resistant material such as brass. The stem 12 is conveniently fabricated from a blank cut from a T-shaped extrusion by machining or otherwise forming, threads 26 on the elongated threaded portion 24 and forming outer surfaces 27, 27a of the head portion 25 by relative rotation about a longitudinal axis 21 of the stem. As shown, the handle portion 23 has a transverse length substantially greater than the diameter of its internal body threads 17, and, preferably, greater than the transverse diemsions of the body 11 to permit the stem to be readily gripped and operated by the fingers of a mechanic.

A blind axial pilot bore 31 extends axially along the stem 12 substantially the full length of the head portion 25 so that the head portion is tubular substantially alongs its full length. That is, an imaginary plane transverse to the axis 21 of the stem would intercept both the outer head surfaces 27, 27a and the interior surface defined by the blind bore 31 anywhere along the major portion of the head length. An axial passage or bore 34 is drilled otherwise formed through the handle and threaded portions 23, 24 of the stem 12. The passage 34 communicates between an end face 36 of the handle and a diametral passage or cross bore 35 drilled or otherwise formed through an area of the stem 12 between the threaded portion 24 and head portion 25.

Figure 2:
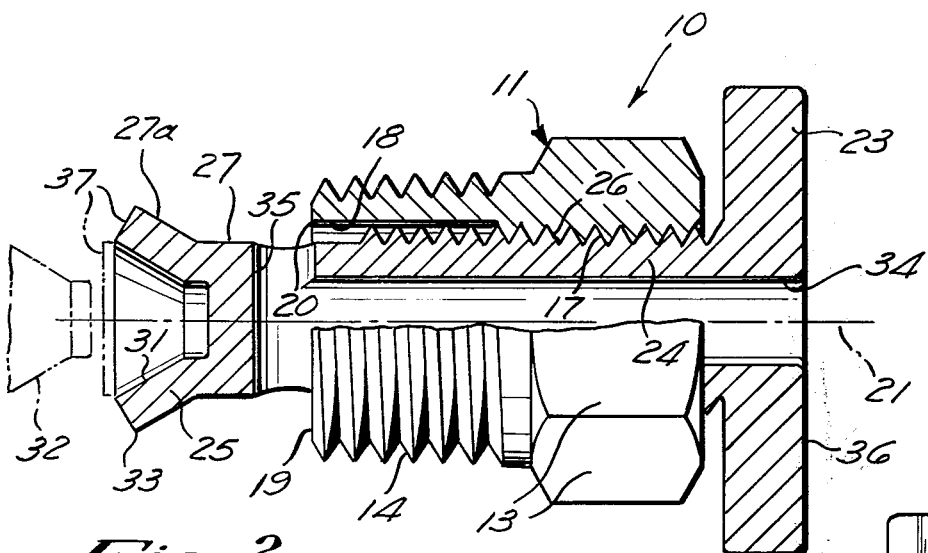
FIG. 2 is a longitudinal view of the valve of FIG. 1, partially in section, shown in its open position.
Figure 3:
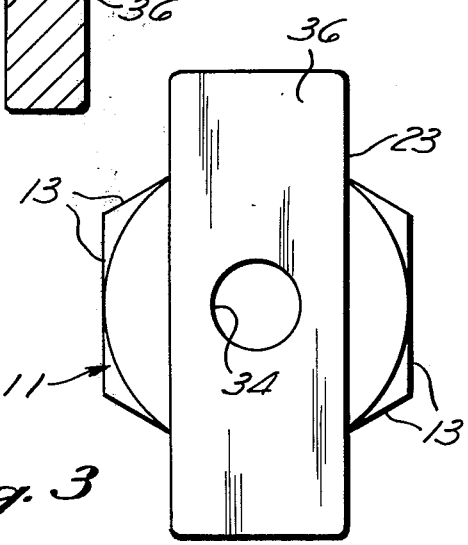
FIG. 3 is an axial view of the valve assembly taken from the handle end.

Prior to the assembly of the stem 12 into the body 11, the stem head portion 25 is substantially cylindrical, having an outer diameter corresponding to the surface 27 and at least as small as the minor diameter of the internal threads 17 of the body, so that the stem 12 is enabled to be screwed into the body head first from the rearward end of the body axially forward to the position illustrated in FIG. 2. A tool 32, illustrated in phantom in the form of a conical ram, is forcibly driven into the bore 31 to plastically expand or flare the head portion 25 radially outwardly to the condition illustrated in FIGS. 1 and 2 where its major diameter, designated 33, is somewhat larger than the body seat 20. This flaring of the head portion 25 provides the conical outer sealing surface 27a, increasing in diameter in a direction away from the handle portion 23, adapted to sealingly engage the annular body seat 20 in an axial zone adjacent an outer end face 37 of the stem 12, as illustrated in FIG. 1.

The disclosed structure of the valve assembly 10 is particularly suited for use as a draincock in an automotive cooling system. As is customary, the body 11 is screwed into a bushing or other threaded port on a radiator or other fluid containing vessel near its lower end to permit the vessel to be drained. Normally, the valve assembly 10 is closed by backing the stem 12 out to the position illustrated in FIG. 2, where the stem surface 27a, sealingly engages the annular seat 20. Fluid pressure on the outer end face 37 and the bore 31 of the head portion 25 tends to advantageously increase the sealing pressure on the seat 20 during service. This increased sealing action and the initial seating of the surface 27a against the seat 20 are facilitated by the tubular structure of the head, which provides a certain amount of resiliency in the head structure to accommodate misalignment or eccentricity between the body 11 and stem 12. It may be seen that sedimentary accumulations in the area of the surface 27a and the seat 20 are readily broken free as the stem 12 is screwed into the body 11 from the position illustrated in FIG. 1 to that illustrated in FIG. 2. In the open position of the stem 12, fluid passes into the cross passage 35 and then through the axial stem passage 34, rearwardly exiting at the handle portion 23.

It may be appreciated that the structure of the disclosed valve assembly 10 comprises a minimum of two parts, thereby offering reduced manufacturing cost. Further, once the head portion 25 is flared or expanded radially, as described, the assembly may not be mistakenly or inadvertently disassembled, since neither the handle nor expanded head portions 23, 24 will pass through the body. While the above description discloses the use of brass to form both the body 11 and stem 12, it is deemed within the scope of the invention that these parts be formed of other materials, with the parts of an assembly being formed of similar or dissimilar materials. For example, both the body 11 and stem 12, or merely the stem, may be formed of a plastic such as nylon, in which case the head portion of the stem may be flared while it is at an elevated temperature to permit it to be plastically deformed in the desired manner. Of course, the parts 11 and 12 may be made of steel, and may be coated or treated to provide corrosion-resistance for service in corrosive environments. It is also contemplated that rather than plastically flaring the stem head portion 25 radially outwardly from an initial cylindrical configuration, the stem may be molded or otherwise formed in situ in the body 11.

While I have described my invention in connection with a specific embodiment thereof, it is to be clearly understood that this is done only by way of example, and not as a limitation to the scope of my invention as set forth in the objects thereof and in the appended claims.

What is claimed is:

1. A valve assembly for draining a fluid carrying vessel such as in an automotive cooling system, comprising a tubular integral body having external threads on a forward end, said body having a through bore, said through bore having internal threads at said rearward body end and a counterbore at said forward body end, said body including a radial end face at said forward end, a junction of said radial end face and said counterbore forming an annular valve seat, a valve stem having external threads in engagement with said internal body threads, said stem having an integral handle at a rearward end and an integral head at a forward end, said handle having a transverse width substantially greater than the diameter of said internal body threads, said stem having an axial passage extending from a point adjacent said head through a rearward face of said handle, said stem having a port on its periphery communicating with said axial passage to conduct fluid from a zone surrounding said head through said stem, said stem head having a conical tubular wall section along substantially its full length and increasing in diameter in a direction away from said handle, said conical tubular head being plastically deformed radially outwardly from an initial major diameter at least as small as said internal body threads to a major diameter sufficient to provide a conical sealing surface adapted to sealingly engage said seat.

* * * * *

UNITED STATES PATENT OFFICE
CERTIFICATE OF CORRECTION

Patent No. 3,948,481　　　　　　　　　Dated April 6, 1976

Inventor(s) Barry R. Pollock

It is certified that error appears in the above-identified patent and that said Letters Patent are hereby corrected as shown below:

Column 2, line 65, after "drilled" insert -- or --.

Column 4, line 27, after "external" insert -- wrenching flats on a rearward end and external --.

Signed and Sealed this

*twenty-ninth* Day of *June 1976*

[SEAL]

*Attest:*

RUTH C. MASON
*Attesting Officer*

C. MARSHALL DANN
*Commissioner of Patents and Trademarks*